United States Patent [19]

Yamaga et al.

[11] Patent Number: 5,240,477
[45] Date of Patent: Aug. 31, 1993

[54] METHOD AND DEVICE FOR REMOVING BUBBLES FROM LIQUID

[75] Inventors: Joji Yamaga; Ryushi Suzuki, both of Tokyo, Japan

[73] Assignee: Kabushikikaisha Opus, Tokyo, Japan

[21] Appl. No.: 862,119

[22] Filed: Apr. 2, 1992

[30] Foreign Application Priority Data

Apr. 3, 1991 [JP] Japan ................................. 3-071118
Mar. 23, 1992 [JP] Japan ................................. 4-064792

[51] Int. Cl.$^5$ ........................................... B01D 19/00
[52] U.S. Cl. ..................................... 55/52; 55/459.1; 96/213
[58] Field of Search .............. 55/52, 204, 459.1, 459.3

[56] References Cited

U.S. PATENT DOCUMENTS

| | | | |
|---|---|---|---|
| 3,007,542 | 11/1961 | Giapapa et al. | 55/52 |
| 3,501,014 | 3/1970 | Fitch et al. | 55/459.1 X |
| 4,585,465 | 4/1986 | Suzuki et al. | 55/52 |
| 4,662,908 | 5/1987 | Suzuki et al. | 55/204 |
| 4,670,410 | 6/1987 | Baillie | 55/459.1 X |

OTHER PUBLICATIONS

"Bubble Elimination By Swirl Flow" Suzuki et al: Journal of the Japan Hydraulics and Pneumatics Society, vol. 19, No. 6 Sep. 1988.

*Primary Examiner*—Charles Hart
*Attorney, Agent, or Firm*—Howard & Civiletti Venable, Baetjer

[57] ABSTRACT

In order to eliminate bubbles in a liquid, the liquid is introduced into a flow passage having circular cross section as tangential flow which turns into swirl flow circulating around axis along the shape of the flow passage and that accelerates and decreases the pressure of the swirl axis and collects bubbles at the portion where pressure becomes lowest, and discharges the collected bubbles through a vent hole or a small vent pipe.

9 Claims, 5 Drawing Sheets

METHOD AND DEVICE FOR REMOVING BUBBLES FROM LIQUID

BACKGROUND OF THE INVENTION

1. Field of the Invention

The present invention relates to a method and a device for removing bubbles in a liquid such as fluid used in hydraulic systems, lubrication oils coating solutions in paper-making machines, paints, chemical solutions such as ink, liquid foodstuffs, and so forth.

Applicable industrial field bubbles in a liquid of the kind described must be removed therefrom because they cause degradation of the fluids, poor product quality, increased compressivity, vibration of equipment and annoying noise.

2. Brief Description of the Related Art

Description of the prior art A bubble removing method has been made known in which the liquid is introduced into a cylindrical body tangentially and bubbles dispersed in the liquid are collected at the swirl center by means of a centrifugal force which makes the bubbles collect where the wall side pressure is higher compared with the center of swirl flow so that they can be removed easily (Japanese patent No. 1371889).

In FIGS. 4 and 5, an example of a device for practicing such a method is shown. A conical or cylindrical body 21, which is a vessel with an internal cylindrical space, is closed at its upward end by a lid 22. One or two inlet ports 23, in which liquid flows tangentially, are located on the cylindrical body close to the lid. Inlet port 23 is connected with a pump 28 through supply line 24. In the Figures, the other end of the cylindrical body 21 is closed by lid 26 where an outlet port 27 is open and is connected with a fluid discharge line 25.

With the above-mentioned structure, the liquid is introduced into the cylindrical body 21 tangentially by the pump 28 with some inflow velocity, and forms a swirl flow inside the body with centrifugal force acting upon the liquid. Consequently, the pressure at the center of the swirl becomes lower in comparison with that of the inner wall region of the body, and so bubbles concentrate towards the swirl center. The pressure at the center of the swirl flow is lowest in the vicinity of the inlet port 23 and increases as the liquid flows downstream; then pressure reaches maximal value and thereafter drops, and a gas column 30 is formed as indicated by lines at the center of the swirl in the vicinity of inlet port 23.

Because the swirl flow has the bubbles coalescing function, the pressure of the center of the cylindrical body in the vicinity of the inlet port 23 is lowered into negative pressure in general, if no pressure restriction is interposed in the downstream line of the cylindrical body, resulting in suction of air from the vent line 32 installed at the center of lid 22 located at the upward end of the cylindrical body 21. In order to solve the problem, a resistance means 29 interposed in the discharge line 25 is controlled so that the above-mentioned pressure of the center of the cylindrical body in the vicinity of inlet port 23 becomes higher than the atmospheric pressure plus liquid head. The resistance means is provided to produce comeback pressure, and vent valve 31 of vent line 32 is opened a little, and the collected bubbles are discharged through the vent line to the outside, and thus bubbles in fluid are eliminated.

SUMMARY OF THE INVENTION

Technical problem to be solved by the invention as mentioned above, the prior art of eliminating bubbles from liquid was by means of basically circulating the liquid in the cylindrical body and obtaining pressure gradient axially and radially in it, collecting the bubbles at the center axis of inlet port said, and then releasing the collected bubbles. In connection with this, for bubble collector of some definite dimension, flow rate decreases, then circulation velocity and pressure gradient of radial direction decrease, and when the radial direction pressure gradient cannot be created, the function of collecting bubbles in the cylindrical body disappears.

The data of the following experiment was disclosed in the description of the Japanese Patent No. 1371889. In an apparatus in which the cylinder had an inner diameter of 40 mm and a height of 360 mm, and the inflow port had a width of 10 mm and a height of 20 mm, a hydraulic oil having a viscosity of 46 cSt was made to flow into a cylinder to carry out elimination of bubbles in the oil. In the data of FIG. 6, when the flow rate is more that 50/1 min the function to eliminate bubbles can be obtained, but at 40 1/min its function is diminished, and when it is less than 30 1/min, the function disappears completely.

In case of disposing of liquids of small flow rate like this, for example those below 30 1/min., when trying to produce swirl flow by using the apparatus proposed by the prior art, namely, a cylindrical body whose size has been reduced in relation to the flow rate, the following problems will occur;

1. Curvature of the inside wall of cylindrical body becomes smaller and it becomes difficult to create a smooth swirl flow. The swirl flow interferes with the short flow passage and decays quickly, turning into axial flow.

2. Contact area of the inlet port, stream resistance, and pressure of liquid inflow supplied tangentially to cylindrical body increases.

3. At the adjacent region of the inlet port of the cylinder, tangential inflow interferes with the generation of the swirl flow.

4. In case of liquid of high viscosity, since the resistance to bubble movement increases and it becomes difficult to generate the swirl flow because it turns into axial flow after a short distance, efficiency of the bubble elimination system drops sharply.

These further problems can be pointed out:

5. Regarding the axial directional pressure distribution of the cylinder for bubble collecting, pressure everywhere increases from the inlet side towards downstream. This fact is clear from the reference paper "Bubble elimination by swirl flow" by Suzuki et. al., which appears in the Journal of the Japan Hydraulics and Pneumatics Society, Vol. 19, No. 6, September, 1988, Published by the Japan Hydraulic and Pneumatic Society, and analyzes the prior art. Accordingly, diameter of bubbles becomes smaller as they move downstream, and moving bubbles to the center axis due to pressure difference of radial direction, that is to say, collecting bubbles, becomes difficult.

6. In the prior art, since the vent port to discharge the collected bubbles outside of the cylinder is located on the center axis adjacent to the inlet port, bubbles move to vent port against axial flow of the liquid, namely, against flow force, so bubble collections prevented.

SUMMARY OF THE INVENTION

The purpose of the present invention consists in offering the device and method to eliminate bubbles effectively from the liquid of small flow rate, solving the problems encountered in the prior art.

In order to fulfill the purpose mentioned above, the present invention proposes a device for removing bubbles from liquid comprising a flow passage of circular cross section having at least one inlet port at one end and an outlet port at the other end; the inlet port causing the liquid to flow tangentially into the inner wall of said flow passage of circular cross section; said flow passage being circumferentially a gas vent hole coaxially being opened at the end of said flow passage in the vicinity of said inlet port, or end of a small vent pipe coaxially inserted in the flow passage being opened at the vicinity of the portion where diameter of flow passage is minimum; and furthermore and a method proposes a device for removing bubbles from liquid which causes liquid to flow tangentially from inlet port to said flow passage to form a swirl flow, said liquid circulate through the flow passage directing outlet port, the swirl flow accelerate at first and then decelerates it, collects bubbles at the vicinity of the portion where the acceleration of liquid turns to deceleration, and removes said coalesced mass of bubbles from the vent hole or the vent pipe located in the collected bubbles.

Since the pressure of the swirl center of the liquid flowing trough the flow passage of the present invention decreases as the swirl flow accelerates from the tangential inlet communicated for the first flow passage towards downstream, and increases further more in the following second flow passage towards downstream, bubbles move to the vicinity of the small diameter end of the first passage and are discharged from the vent hole or the end of the small pipe opened at the center of this area. In the line downstream of the device, back pressure means are inserted, and by means of making the pressure of swirl center of the portion of minimum pressure higher enough to overcome atmospheric pressure plus pressure loss of small vent pipe, bubbles collected at the portion of minimum pressure are discharged.

DESCRIPTION OF THE PREFERRED EMBODIMENTS

Figure 1:
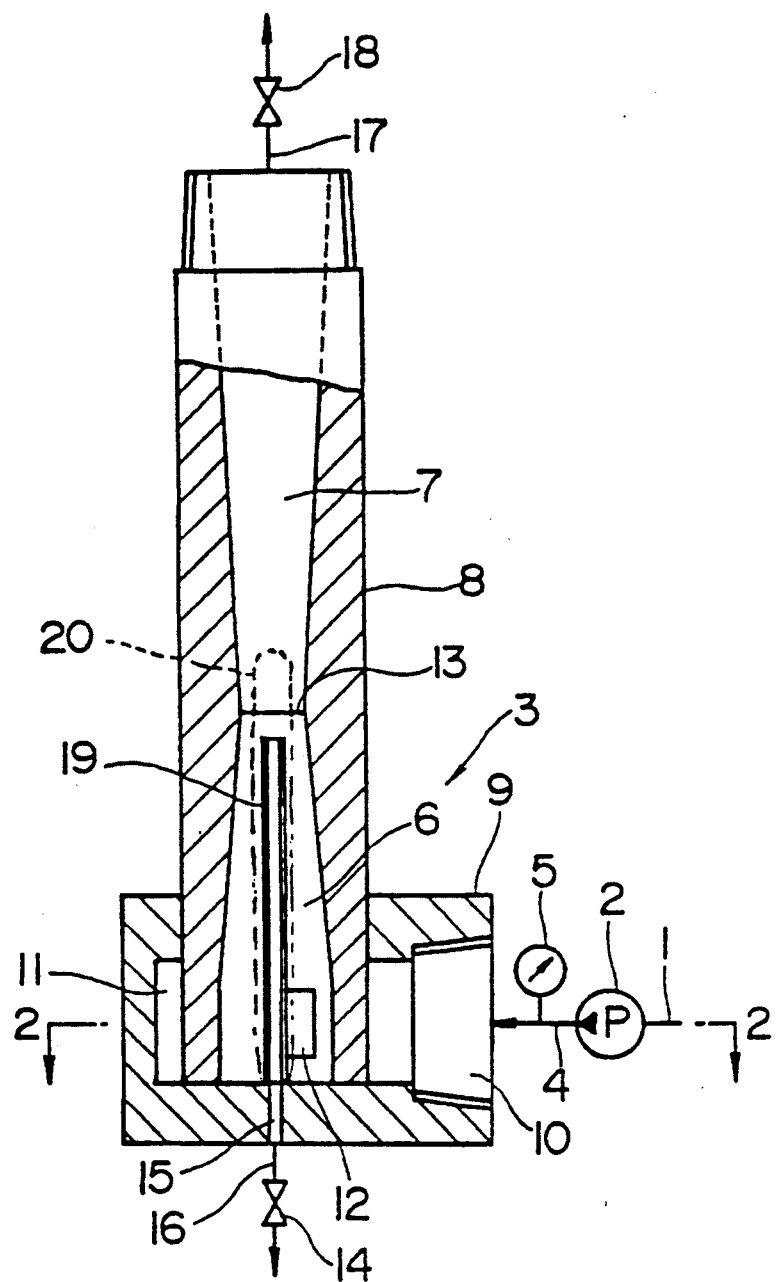
FIG. 1 is a longitudinal sectional view for showing a first embodiment of the present invention.
Figure 2:
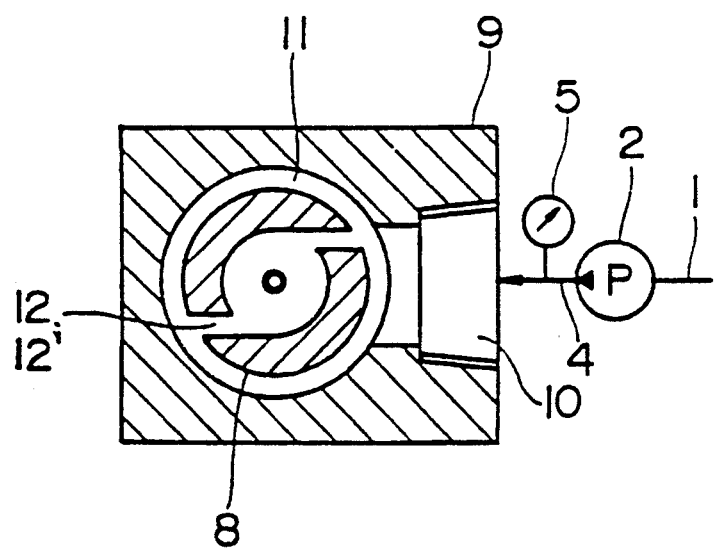
FIG. 2 is a view looking in the arrow 2—2 in FIG. 1.

The present invention is explained by means of the following preferred embodiment in conjunction with accompanying drawings. In FIG. 1 in which the first example of the present invention is illustrated, a pipe 1 to suck the liquid is connected to a pump 2 is series, and the delivery side of the pump is connected to a supply port 10 of a bubble collector 3. A pressure gauge 5 is provided to a supply line 4 located between pump 2 and bubble collector 3.

The bubble collector 3 consists of a cylindrical body of outer wall having flow passage comprising the first passage 6, the second passage 7, and a block 9 enveloping the adjacent area of the upward end of the first passage 6 of the cylindrical body. The block 9 is provided with the supply port 10 and an annular passage 11 which are connected to one another, and the outer wall of a cylindrical body 8 adjacent to the inlet side end is surrounded by an annular passage 11 so that the liquid flows tangentially into the first passage 6 of the cylindrical body 8 from the outer space of the inlet side end.

Inlet port 12 is formed through the first flow passage of the cylindrical body 8 at the upward end so that the first flow passage 6 is connected tangentially to annular passage 11. The cylindrical body 8 has a first flow passage 6 of conical shape whose diameter becomes gradually and continuously smaller towards the downstream side and the second flow passage 7, and is connected with the second flow passage at junction 13 having either a reverse conical shape whose diameter becomes larger gradually and continuously or a cylindrical shape with a diameter at least the size of the junction. The flow passage 7 is so designed that as the liquid flows downstream, a centrifugal force acting on the swirl flow becomes smaller and the pressure of the swirl increases. A vent hole 15 is formed through block 9 surrounding the upstream end of the cylindrical body 8 along its axis. A vent line 16, wherein a vent valve 14 is inserted, is connected to the vent hole. A discharge line 17 is connected to the downstream end of the secondary flow passage 7 of cylindrical body 8 and resistance means 18, such as a throttle valve to provide back pressure, is incorporated in the line 17. As a pressure means an orifice, a check valve or a pipe of small sectional area can be used for some cases.

From the vent hole 15 of block 9 a small vent pipe 19 is inserted along the center of the first flow passage 6 to junction 13 which connects it to the secondary flow passage. Collected bubble mass at the end port of vent pipe is illustrated as reference No. 20.

The mode of operation of the first embodiment will be described next.

Liquid containing bubbles is sucked by pump 2 through suction pipe 1 and is delivered through supply line 4 to bubble collector 3; it then passes through supply port 10 and annular passage 11 to inlet port 12, streams tangentially to the first flow passage 6 of cylindrical body 8, and moves downstream in the first flow passage 6 as a swirl flow. When pump 2 is driven, it is necessary to open resistance means 18, such as throttle valve 18, beforehand. Since the diameter of the first flow passage becomes gradually and continuously smaller towards downstream, an angular velocity of swirled liquid in the flow passage increases toward downstream and centrifugal force increases.

Centrifugal force acts on the swirl flow, so then the pressure at the center of the swirl is lower in comparison with that of the inner wall region of the cylindrical body. Change of diameter of the first flow passage is decided by the conditions of liquid so that the pressure at the swirl center decreases from inlet port side to downstream.

The liquid swirls downstream through junction 13, where the diameter is the smallest in the flow passage, and through the second flow passage which is either cylindrical or conical and whose diameter becomes larger moving downstream so that the swirl motion continues. Since the centrifugal force decreases in the secondary flow passage 7 as the liquid flows downstream, the pressure of the swirl center increases as the liquid flows downstream and finally reaches the end of cylindrical body 8. Namely, pressure of the swirl center of fluid in the cylindrical body 8 becomes lowest at the junction of the first and second flow passages.

Bubbles in the fluid are fed to the first flow passage 6 and swirled within the fluid in the passage and then moved to the center of the swirl by means of buoyancy caused by a radial directional pressure difference produced by centrifugal force. The bubbles gather into the collected bubble mass 20 at the first and secondary flow passages where the pressure is lowest, and then are collected.

Next, the pressure around the junction portion of both flow passages where bubbles are collected is raised in a way that throttles the resistance means 18 which is inserted in discharge line 17 for raising back pressure. After these procedures, vent valve 14 of vent line 16 is opened in order to discharge collected bubbles through small vent line 16, and the liquid from which bubbles are eliminated flows from discharge line 17.

When valve 14 of vent line 16 is opened without raising the back pressure of discharge line 17, the pressure at the center of the swirl flow at junction 13 becomes negative because of the action of centrifugal force. Air is sucked from vent line 16, so the procedure mentioned above is required. Pressure gauge 5 indicates the delivery pressure of pump.

When the back pressure to be given is known in order to discharge the collected bubbles of a specific liquid condition, the throttle valve for the resistance means 18 can be replaced by another back pressure means whose pressure cannot be controlled, such as an orifice, check valve, or pipe of small cross sectional diameter, etc.

Figure 3:
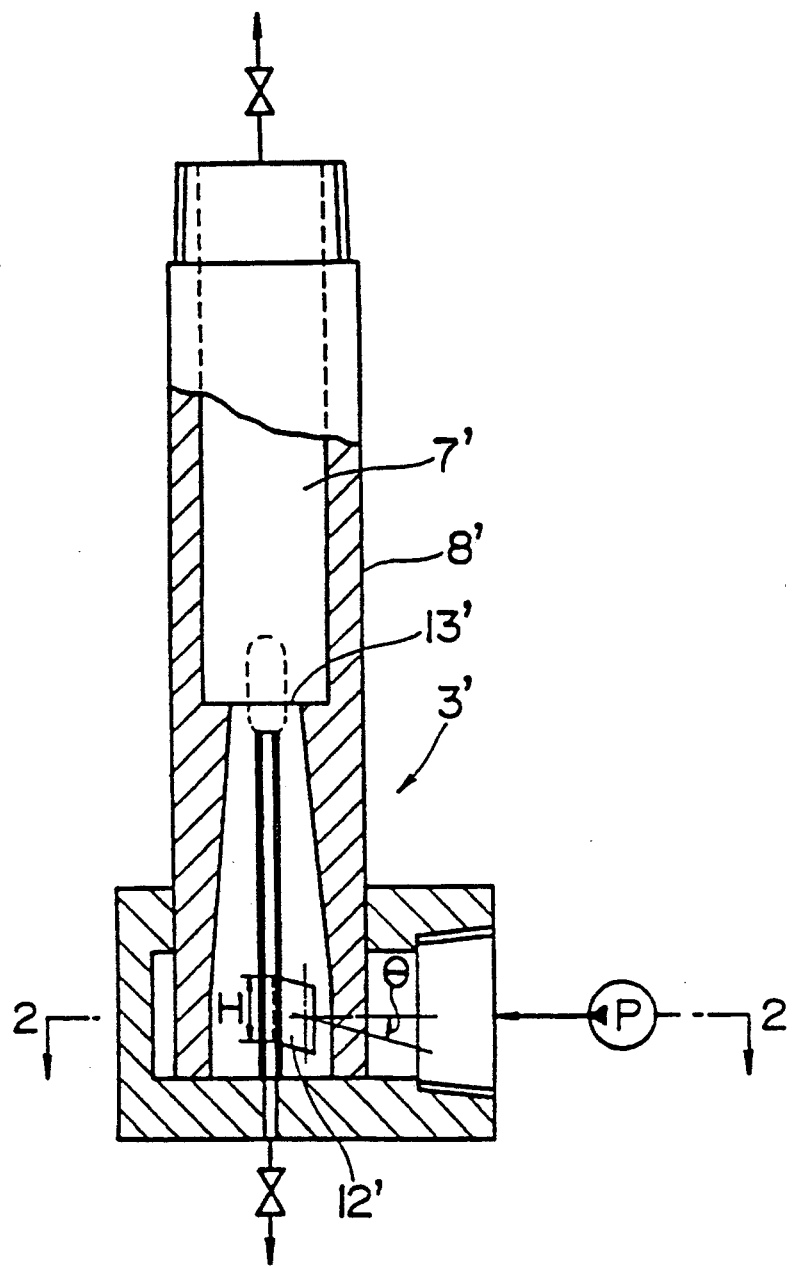
FIG. 3 is a longitudinal sectional view for showing a second embodiment.
Figure 4:
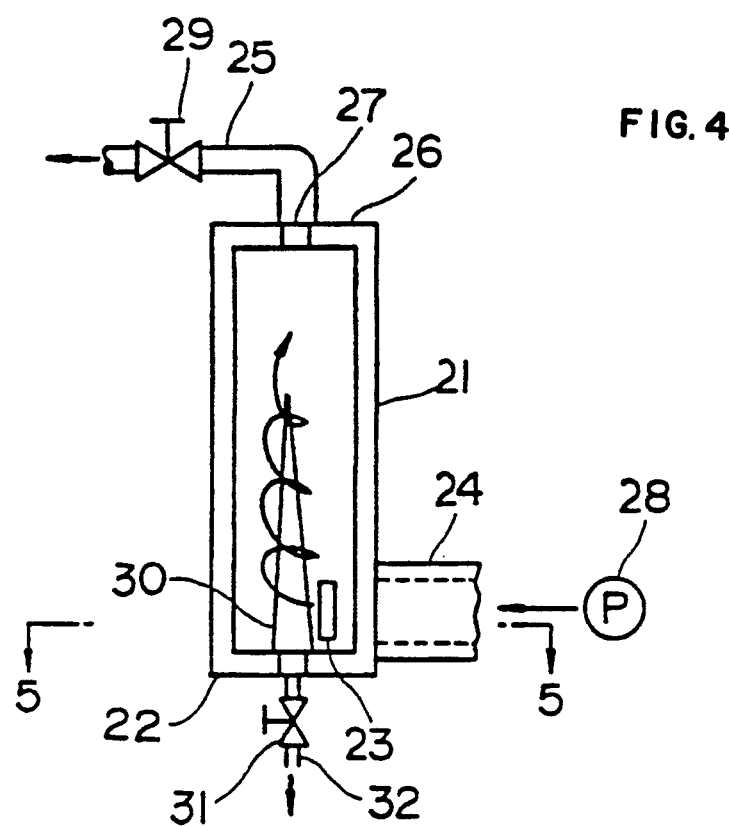
FIG. 4 is a longitudinal sectional view of a prior art bubble collector.
Figure 5:
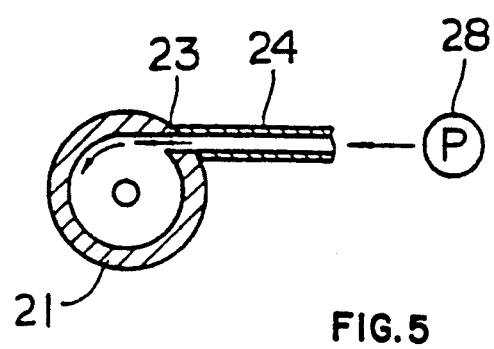
FIG. 5 is a view looking in the arrow 5—5 in FIG. 4.
Figure 6:
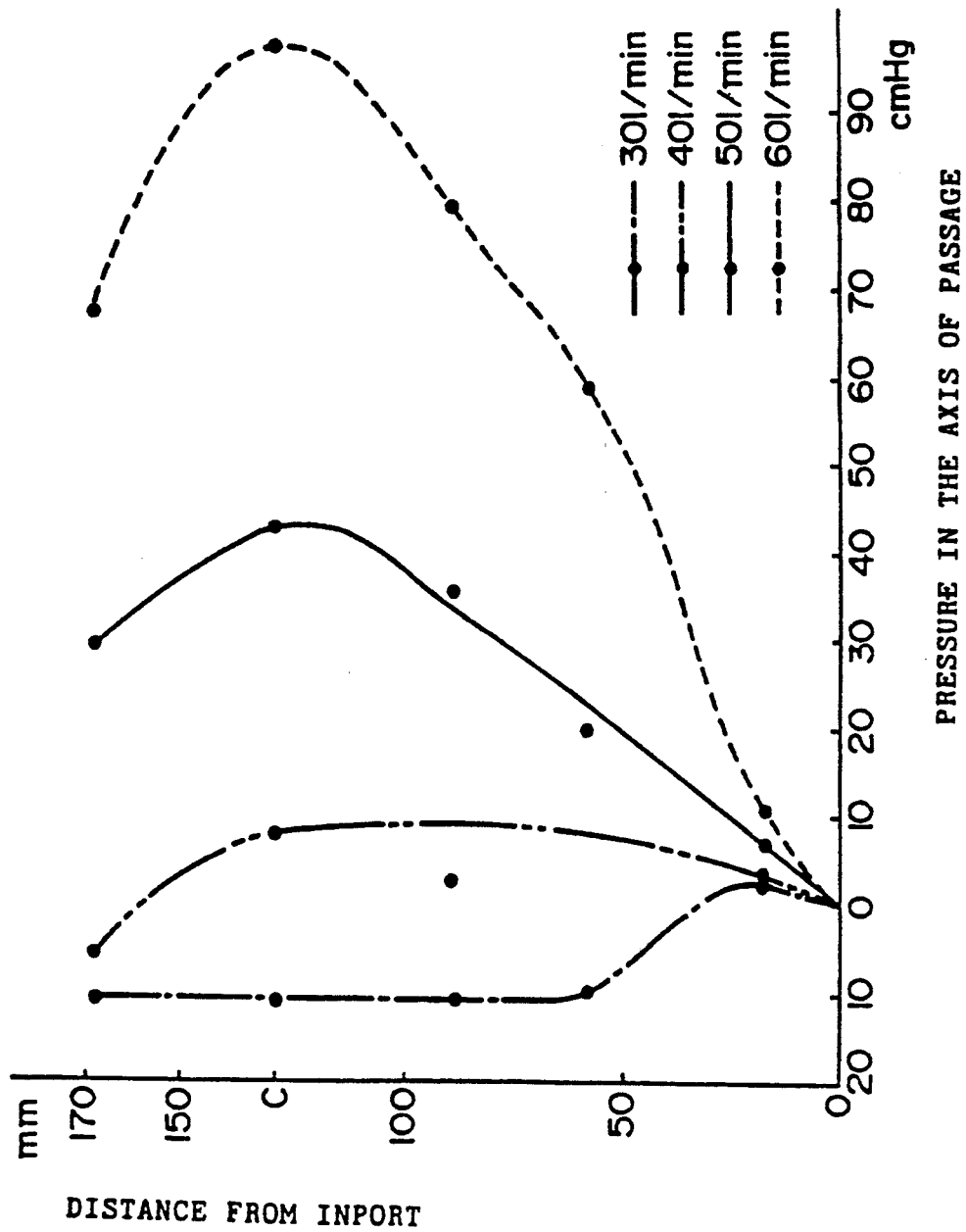
FIG. 6 is a diagram showing the result of measurement of the fluid pressure along the center axis of the swirl inside the apparatus of the prior art.

FIG. 3 shows the second embodiment of the invention. In the FIG. 3 each components working the same as those of the first embodiment provides with the same reference numeral. However this embodiment is so different from the first embodiment that:

The inlet ports 12' of a body 8' having an cylindrical outer surface of the bubble collector 3' are directed to the central axis at an angle $\theta$ in the direction of axial flow. $\theta$ is given as following formula:

$$\tan \theta = \frac{\text{height of i}}{L}$$

Where: L may be calculated as $$L \approx \pi r.$$

The second flow passage 7' is provided with a diameter same or larger than the smallest diameter of the first flow passage. This configuration of the second passage makes a central pressure of the swirl flow increasing in the direction of outlet. The working of the second embodiment is described as follows;

The working of the second embodiment from inlet to outlet of the liquid involving bubbles is the same as that of the first embodiment. However the liquid introduced from the inlet port of the first flow passage (b) encounters with liquid flowing in from the port (6) so that the swirl action of the flow can be reduced. Therefore in case of processing a little amount of liquid, bubble can not be removed from the liquid, even if there be the small diameter of the flow passage in accordance with the small amount of liquid.

The concept according to the second embodiment prevents a mutual contact of a swill flows by means of an inlet port directed to the central axis at an angle $\theta$ in the direction of axial flow. Therefore the center pressure of swirl flow is the lowest in the vicinity of joining point (13'), and the swirl flow in the second flow passage is reduced owing to the viscosity of the liquid, so that it increases in the direction of the outlet port. When a liquid with a high vicinity moves to the outlet, a swirl flow can be reduced and the central pressure of it increased. Therefore the second flow passage may be provided with a cylindrical inner surface.

EFFECT OF PRESENT INVENTION

According to the present invention, as liquid flows downstream form the upstream side, the diameter of the flow passage decreases and centrifugal force increases. Therefore, the pressure along the center axis decreases, and bubbles are collected at the portion where the pressure becomes minimum. Thus collected bubbles are discharged from the vent pipe whose port is opened around the area of minimum pressure. This method has the following features when compared with the prior art.

(1) Since swirl radius of liquid at the portion for collecting bubbles becomes shorter, bubbles move towards center axis easily. Centrifugal acceleration and pressure gradient of radial direction becomes larger, so a larger centrifugal force is exerted on bubbles.

(2) Since enough swirl flow energy is given for liquid at the inlet port, swirl motion continues for a long distance towards downstream side, and the number of swirl motions of liquid can be increased, then the efficiency of bubble elimination increases.

(3) Since pressure increases towards downstream side from the portion where pressure is minimal, bubbles are collected at the vicinity of the portion where the pressure is minimum. As the number of swirl motions increases, the efficiency of bubble elimination increases.

(4) As the pressure of the liquid of decreases downward axially from the inlet port side to the area of minimum pressure, the diameter of bubbles becomes larger and therefore bubbles move easily to the center of the swirl flow. In this area, axial movement direction of bubbles and that of liquid are the same, so bubbles move easily to the part where pressure is minimal.

(5) As mentioned above, by means of the present invention, bubbles of liquid of small flow rate can be collected at the portion where pressure is minimal, and so bubbles can be eliminated from liquid effectively with almost no regard to flow rate, and structure of the device is so simple that the equipment necessary for bubble removal can be installed easily.

We claim:

1. Device for removing bubbles from a liquid comprising;
   (a) a flow passage of circular cross section having at least one inlet port at one end thereof and an outlet port at the other end thereof, said inlet port causing said liquid to flow tangentially into said flow passage,
   (b) said flow passage having a first flow passage reducing the diameter gradually and continuously from said inlet port toward said outlet port and a second flow passage being connected directly with said first flow passage, increasing the diameter thereof gradually and continuously from the connection with said first flow passage to said outlet port, and (c) a gas vent pipe coaxially provided in said flow passage being opened at the vicinity of a portion where the diameter of said first flow passage is minimum.

2. Device according to claim 1, wherein said first flow passage has such a conical shape as the diameter thereof reduces from said inlet port toward said outlet port.

3. Device according to claim 2, wherein said second flow passage has such a cylindrical shape as to diameter thereof is not smaller than that of said first flow passage at the connection thereof with said second flow passage.

4. Device according to claim 3, further comprising resistant means on a discharge line of said outlet port.

5. Device for removing bubbles from a liquid comprising:

(a) a flow passage of insular cross section having at least one inlet port at one end thereof and an outlet port at the other end thereof, said inlet port causing said liquid to flow tangentially into said flow passage, (b) said flow passage having a first flow passage reducing the diameter gradually and continuously form said inlet port toward said outlet port and a second flow passage being connected directly with said first flow passage, increasing the diameter thereof gradually and continuously from the connection thereof with said first passage to said outlet port, and (c) a gas vent hole being coaxially provided with said flow passage and opened at the end of said first flow passage in the vicinity of said inlet port.

6. Device according to claim 5, wherein said first flow passage has said a conical shape as the diameter thereof reduces from said inlet port toward said outlet port.

7. Device according to claim 6, therein said second flow passage has such a cylindrical shape as the diameter thereof is not smaller than that of said first flow passage at the connection thereof with said second flow passage.

8. Device according to claim 7, further comprising resistant means on a discharge line from said outlet port.

9. Method for removing bubbles from a liquid comprising the following steps;

(a) introducing said liquid tangentially into a flow passage of a circular cross section;

(b) so producing and accelerating swirl flow through a first flow passage of said flow passage toward an outlet port;

(c) then decelerating said swirl flow turning to an axial flow and collecting bubbles of said liquid at the portion where acceleration is transformed into declaration; and (d) discharging said bubbles collected.

* * * * *